July 15, 1958     H. L. COOK ET AL     2,843,076

FORCE MEASURING DEVICE

Filed June 28, 1957

INVENTORS:
HOWARD L. COOK
LEON R. CLARK
RUSSELL F. KNOPP
DENNIS A. MARLOW

BY *Ralph B. Pastoriza*

ATTORNEY

United States Patent Office 2,843,076
Patented July 15, 1958

2,843,076

FORCE MEASURING DEVICE

Howard L. Cook, Santa Barbara, Leon R. Clark, Goleta, and Russell F. Knopp and Dennis A. Marlow, Santa Barbara, Calif., assignors to Aerophysics Development Corporation, a corporation of California Application June 28, 1957, Serial No. 668,734

5 Claims. (Cl. 116—114)

This invention relates generally to force measuring instruments and more particularly to novel device for indicating whether or not a predetermined force has been exceeded.

There are many instances in which a force measuring device for indication of whether or not a predetermined force has been exceeded would be useful. In transporting items of a fragile nature, for example, it is oftentimes desired to know whether the shipping container and contents have been subjected to undue shock loads. Ordinarily the maximum load or shock which an item can withstand before breakdown is known. Therefore, it is only necessary to know whether this load or shock has been exceeded during transport in order to determine whether any damage sustained occurred during the shipping operation.

Accordingly, it is a primary object of the present invention to provide an extremely inexpensive and mechanically simple force measuring device for indicating whether or not a predetermined load has been exceeded.

More particularly, it is an object to provide a device of the above type which is portable and may be readily attached to shipping containers or the like to indicate whether a maximum shock load has been exceeded during transportation.

Still another object is to provide a device of the above type in which the predetermined shock load or force required to actuate the device may be varied by a simple manual adjustment.

Briefly, these and other objects and advantages of the invention are attained by providing a magnet together with a keeper or member made of magnetic material. A non-magnetic stop means is secured to the magnet and includes a seating portion interposed between the member and the magnet itself. The member is held in the seating portion at a pre-set distance from the magnet by magnetic attraction. The force of attraction of the magnet may be varied by changing this pre-set distance. When the device is attached to a shipping container, for example, if the container is subjected to a shock which exceeds the force of attraction between the member and the magnet, the member will fall free of the magnet. A simple visual inspection of the device after arrival of the container to determine whether or not the member is positioned in the seating portion of the stop will immediately indicated whether this force has been exceeded during the shipping. By providing suitable guide means, the dislodgment of the member may be limited to a single direction whereby shock force components may be measured by providing three such devices positioned on mutually perpendicular axes.

A better understanding of the invention will be had by referring to the accompanying drawings in which.

Figure 1:
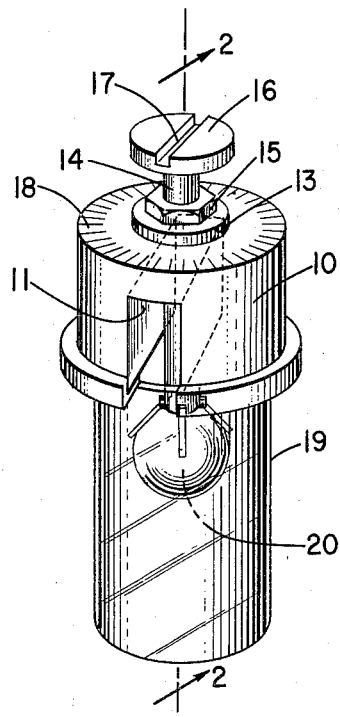
Figure 1 is a perspective view of one embodiment of the invention.
Figure 2:
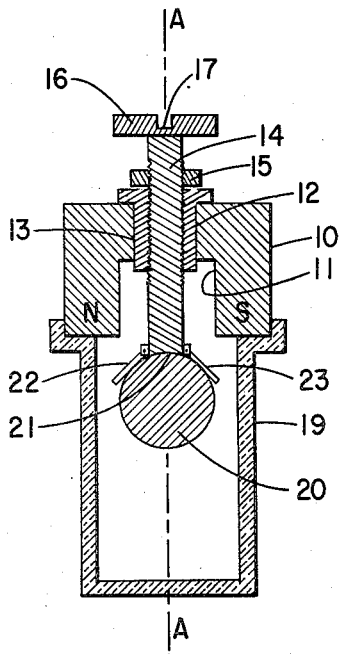
Figure 2 is a cross-section taken in the direction of the arrows 2—2 of Figure 1.

Referring to Figures 1 and 2, there is shown cylindrical magnet 10 which preferably comprises a permanent magnet but in certain applications may be an electromagnet. The maget 10 includes a transverse diametric channel 11 providing essentially a horseshoe structure in cross-section. As shown best in Figure 2 the magnet is provided with a central bore 12 within which is received a brass threaded insert 13. A threaded shaft 14 is received in the insert 13 and provided with a lock nut 15 such that the lower end portion of the shaft 14 may be secured at various different distances from the poles N–S of the magnet. To facilitate threading of the shaft 14, there may be provided an enlarged head 16 with a driving slot 17.

As best seen in Figure 1 the driving slot 17 may also serve as an alignment indicator cooperating with a scale 18 about the periphery of the magnet such that the threaded extent of the shaft 14 is indicated.

A guiding structure comprising a cylindrical transparent plastic housing 19 is secured about the lower end of the magnet 10 to surround a magnetic member 20 in the form of a sphere. Normally, the member 20 is retained in a concave seating end surface 21 in the lower end of the shaft 14 by magnetic attraction. The force of this magnetic attraction will depend upon the distance between the end seating surface 21 and the magnetic poles and thus may be varied by changing the threaded extent of the shaft 14. The guiding cylindrical plastic sleeve 19 is arranged to limit movement of the member 20 to a direction away from the magnet 10.

Figure 3:
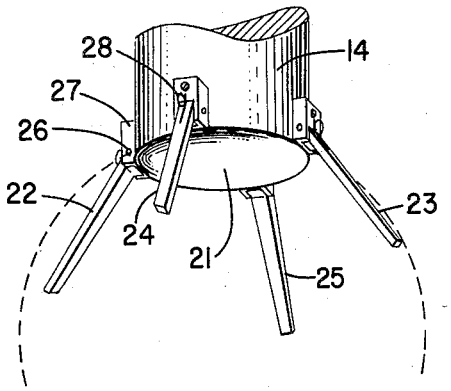
Figure 3 is an enlarged perspective view of the seating portion of the stop means employed in the device of Figure 1.
Figure 4:
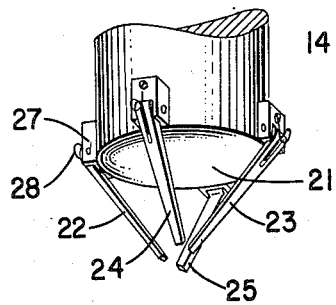
Figure 4 illustrates the condition of this seating portion after a predetermined force has been exceeded.

As best shown in Figures 3 and 4, a plurality of spring fingers 22, 23, 24, and 25 are pivoted such as at 26 to blocks 27 secured to the peripheral portions of the seating surface 21. Small hairpin type springs 28 are positioned between the spring fingers and the mounting blocks and biased to urge the fingers to swing inwardly together.

Referring specifically to Figures 2 and 3, with the member 20 seated on the seating surface, the various fingers are held in a spread condition. Once the member 20 is dislodged from the seating surface, the fingers are free to move to the position shown in Figure 4. In this closed position the fingers prevent the member 20 from reseating on the surface 21.

In operation, the threaded shaft 14 is threaded into or out of the insert 12 to an extent to provide a given attraction force between the member 20 and the magnet 10. For example, if it is desired to determine whether a shock load of 5 $g$'s will be exceeded, this attraction force will be adjusted such that any force greater than 5 $g$'s exerted in the upward direction of the axis A—A will result in the member 20 escaping from the seating surface as a result of its inertia whereas any force of 5 $g$'s or less will not be sufficient to overcome the magnetic attraction. To facilitate this adjustment, the scale 18 in Figure 1 may be calibrated directly in force units.

The entire device is then rigidly secured to a shipping container, for example, with the member 20 initially positioned in the seat 21. After the shipping container has arrived at its destination a visual inspection of the device will immediately indicate if a shock load exceeding 5 $g$'s has occurred. If the member 20 is no longer seated on the surface 21, for example, it will be evident that the device was subjected to a force having a component along the axis A—A in an upward direction exceeding 5 $g$'s. By employing three such devices oriented in mutually perpendicular directions, an indication as to three force components will be provided.

The entire device is extremely simple in construction and therefore very economical to manufacture. Further, since the magnetic properties of the magnet 10 remain substantially constant in all normally encountered environments, the device may be made extremely accurate. Finally, it is a simple matter to remove the guiding structure 19, spread the fingers and re-set the member 20 so that the same device may be reused a number of times.

In actual embodiments forces between 1 and 100 g's have been readily indicated.

While the invention has been described with respect to a particular application, it is to be understood that many other uses as well as minor modifications in its structure falling within the scope and spirit of the invention will occur to those skilled in the art. The force measuring device, therefore, is not to be thought of as limited to the specific embodiment shown and described for illustrative purposes.

What is claimed is:

1. A shock indicating device comprising, in combination: a magnet; a member made of magnetic material; a stop support structure including a threaded insert secured to said magnet; a threaded shaft receivable in said insert and including a seating end receiving said member, the axis of said shaft being oriented such that threading of said shaft into and out of said insert varies the distance of said seating end from said magnet; and a guide structure secured to said magnet for limiting movement of said member away from said seating end to a direction in which the magnetic force of attraction between said magnet and said member decreases.

2. A device according to claim 1, in which said guide structure comprises a transparent cylinder surrounding said member with its axis aligned in said direction whereby the position of said ball with respect to said seating end is visible.

3. A device according to claim 2, including spring fingers pivotally secured adjacent the peripheral portions of said seating end and biased inwardly to block said seating end from receiving said member in the absence of said member.

4. A device according to claim 3, including scale means stationarily positioned adjacent said threaded shaft to indicate the threaded extent of said shaft.

5. A force indicating device comprising, in combination: a magnet; a member attracted to said magnet; a stop support structure having one portion supporting said member a given distance from said magnet; distance adjusting means connecting said stop support structure to said magnet so that said given distance can be varied; and a guide structure secured to said magnet for limiting movement of said member away from said portion of said support structure to a direction in which the magnetic force of attraction between said magnet and said member decreases.

References Cited in the file of this patent

UNITED STATES PATENTS 1,842,384    Blanchard _____ Jan. 26, 1932